United States Patent [19]

Braun et al.

[11] 4,028,072

[45] June 7, 1977

[54] APPARATUS FOR SCRUBBING OF HYDROCARBONS FROM GAS

[75] Inventors: Walter Braun, Nievenheim; Gunter Hoffmann, Stuttgen, both of Germany

[73] Assignee: Aluminium Norf GmbH, Stuttgen, Germany

[22] Filed: Oct. 24, 1975

[21] Appl. No.: 625,654

[30] Foreign Application Priority Data

Oct. 28, 1974 Germany ............................ 2451157

[52] U.S. Cl. ..................................... 55/195; 55/42; 55/43; 55/93; 55/228; 55/259; 202/202; 202/183; 203/42

[51] Int. Cl.² ........................................ B01D 47/00

[58] Field of Search ............ 55/38, 43, 42, 48, 49, 55/50, 55, 56, 68, 73, 228, 259, 84–95, 189, 195, 196, 208; 202/183, 202; 203/42

[56] References Cited

UNITED STATES PATENTS

| | | | |
|---|---|---|---|
| 2,649,166 | 8/1953 | Porter et al. | 55/42 |
| 3,016,981 | 1/1962 | Fritz | 55/48 |
| 3,219,051 | 11/1965 | Francis | 55/49 |
| 3,499,935 | 3/1970 | King | 203/74 |
| 3,634,201 | 1/1972 | Kehse | 203/42 |

*Primary Examiner*—Bernard Nozick
*Attorney, Agent, or Firm*—Norman S. Blodgett; Gerry A. Blodgett

[57] ABSTRACT

Apparatus for separating hydrocarbons from flue gas and the like, including a gas scrubber, a collecting container supplying the scrubber with wash oil, and a vacuum distillation container receiving wash oil discharged from the scrubber.

9 Claims, 1 Drawing Figure

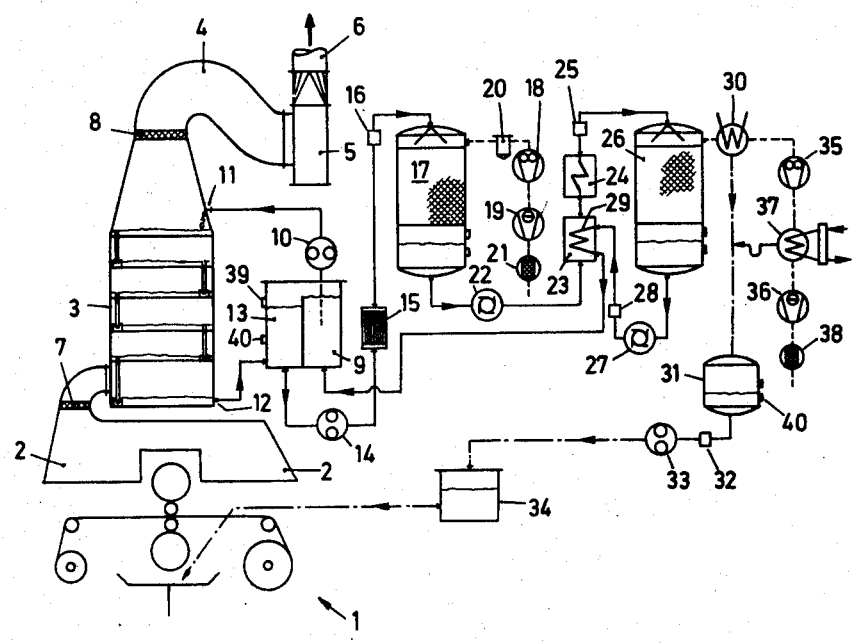

APPARATUS FOR SCRUBBING OF HYDROCARBONS FROM GAS

BACKGROUND OF THE INVENTION

Streams of exhaust or waste air and gas which occur in manufacturing plants contain in a number of cases hydrocarbons such as oils, petroleum fractions, benzines and solvents. Since the entrained hydrocarbons generally constitute a loss of operating material, the attempt has already been made at the point of formation to reduce or even to prevent the escape of these hydrocarbons. In most cases, however, the charging of the waste air with hydrocarbons cannot be reduced to values which are sufficiently low so as to comply to the amounts which are prescribed as highest permissible values in conformity with the protection of the environment or established law. Consequently, it is necessary for the discharged exhaust or waste air to be subjected to cleaning processes, which drastically reduce the concentration of the hydrocarbons which are contained in the said air and are to be classified as pollutants in the sense of the environment.

The pollutants can occur in exhaust air or gas flows in the form of gas or in the form of small drops. For separating out pollutants which are entrained in the liquid phase in the form of droplets, it is common to employ baffle separators, cyclones, demisters, electric separators or the like, which devices (depending on the design) may be capable of separating out droplets as small as 0.5 $\mu$m.

However, it has proved to be difficult to separate out pollutants which are contained in the exhaust air in gaseous phase or even in the form of ultra-fine droplets. It is, of course, common to use activated carbon for separating out substances in the gaseous form. In connection with the large quantities of exhaust or waste air which occur, for example, during the running of a rolling mill and containing correspondingly large amounts of pollutants, filters which contain active carbon are extremely expensive. For example, it would be necessary for 50 liters of the pollutants per hour to be separated out, which pollutants (along with their additives) clog the carbon and make it unsuitable for use, so that a frequent change of filters becomes necessary and the removal of spent filter contant becomes a problem.

Some solid, liquid and gaseous pollutants can, of course, be removed from the waste air by means of conventional perforated plate scrubbers or washers operated with water, but the cleansing from the exhaust air of hydrocarbons such as oils, petroleum fractions, benzines and the like is impossible.

Thermal as well as catalytic post-combustion methods are also known in principle. Like the deposition of such gaseous pollutants in cooling traps, these cleaning processes cannot be used economically with exhaust or waste air which is formed in large quantities, since too large air quantities, heated to above the combustion-/oxidation temperature of the pollutants, have to be cooled down to an optimal separation temperature or large quantities of catalysts (which have to be replaced relatively frequently) would have to be used.

The object of the present invention is to provide a process and apparatus by which large quantities of hydrocarbons along with the exhaust gas in which they are entrained are capable of being purified at an economically allowable expense.

With these and other objects in view, as will be apparent to those skilled in the art, the invention resides in the combination of parts set forth in the specification and covered by the claims appended hereto.

SUMMARY OF THE INVENTION

In general, the invention is achieved by the exhaust or waste air charged with hydrocarbons being washed or scrubbed in counter-flow by means of a washing oil which is conveyed in a closed path. A low vapor pressure reliably prevents vapor losses during the washing or scrubbing. Washing oil which has passed through being again supplied to the initial collecting container after the absorbed foreign substances of higher vapor pressure are extracted by vacuum distillation. In carrying out this process, it is possible at tolerable expense to treat large flows of waste gas and to remove from them the hydrocarbons included therein as pollutants. The consumption of wash oil remains low in such a case, since losses during the scrubbing or washing itself are largely avoided because of the vapor pressure of the wash oil; the latter, after use, is regenerated by extracting the absorbed volatile constituents.

It has proved successful to carry out the vacuum distillation of the wash oil by a fractionation procedure in such a way that, initially, without essential heating and at a pressure from 1 to 15 mm. Hg., absorbed water and absorbed gases are essentially separated, while, in a second stage, after heating up to a temperature from 80° to 150° C at a pressure which is below 5 mm. Hg., the absorbed hydrocarbons are distilled out.

For carrying out the process, it has proved to be desirable to provide an apparatus in which the hydrocarbon-charged gas is supplied to a chimney or flue discharging them by way of an exhaust air scrubber, which is charged in counter-flow with wash oil derived from a collecting container. The wash oil delivered at the outlet of the exhaust air scrubber is supplied by way of means producing a defined delivery flow to a vacuum distillation container evacuated by way of a condenser through a vacuum pump assembly. The discharge of the condenser delivers the condensate via a condensate storage and via a pump arranged after the latter, while a pump arranged on the delivery side of the vacuum distillation container causes the return into the storage container of the wash oil which has passed through said distillation container. In this way, a closed circuit is produced for the wash oil which causes the separation of the hydrocarbons from the exhaust air. The circuit can be operated either continuously or intermittently. The individual conveyor means is uncoupled to such a degree by the collecting containers (or the capacity of the vacuum vessels) that the control of the process is facilitated. As an essential advantage, the recovered hydrocarbons are separated out, so that in general the savings which are made in this way are sufficient to cover the running costs of operating the apparatus.

It has been found to be advantageous to associate a heating means with the vacuum distillation container. This heating means can be provided in that supply line for the wash oil which leads to the vacuum distillation container, and a high thermal efficiency can be produced if, in addition, a heat exchanger is associated with the vacuum distillation container, the systems of said exchanger being acted upon by the wash oil supplied to the vacuum distillation container and by the wash oil extracted from the latter.

An oxidation of the wash oil under the influence of the temperature reached during the distillation is prevented by the vacuum distillation container having arranged ahead of it a vacuum preliminary degasifying unit with a vacuum pump assembly associated with the latter. The vacuum preliminary degasifying unit preferably has a higher pressure potential than the vacuum distillation container. The circulation of the wash oil is relieved of dirt and solid particles which are taken up by the said oil, if a dirt filter is arranged after the outlet of the exhaust air scrubber. The wash oil circulation is also relieved of hydrocarbons and the passage of droplets of wash oil into the chimney or flue is reliably avoided if the supply and discharge paths of the exhaust air scrubber are equipped with oil separators.

The circulation of the wash oil can be easily controlled or influenced if proportioning pumps are arranged ahead of the vacuum distillation container and/or the vacuum preliminary degasifying unit. Preferably associated with the proportioning pumps are pressure valves (against the resistance of which these pumps have to operate), so that the drive means of these pumps absorb energy. In order to safeguard against the passage of air, check valves or pressure valves are associated with the pumps which discharge the wash oil or the condensate. Furthermore, it has proved to be desirable to equip at least one of the vessels (or one of the containers) with level-limiting switches which are operative on the control means of the apparatus.

The apparatus as described is used to advantage for separating and also possibly recovering rolling and/or cooling oil residues from the exhaust air of rolling mill stands.

BRIEF DESCRIPTION OF THE DRAWINGS

The character of the invention, however may be best understood by reference to one of its structural forms, as illustrated by the accompanying drawings, in which:

The invention is explained in detail by reference to the description of one constructional example and in conjunction with a drawing which illustrates the said constructional example.

DESCRIPTION OF THE PREFERRED EMBODIMENT

The drawing shows a roll stand of an aluminum cold-rolling mill. Used for cooling and lubricating the rolls during operation is a roll oil, which represents a hydrocarbon fraction in which the boiling points of the separate components are between 200° and 250° C. Dring the rolling operation, some of the roll oil passes in droplet form and, assisted by the higher temperatures sometimes reached during the rolling, also in gaseous form, into the exhaust air of the rolling mill.

Mounted on the roll stand 1 are discharge hoods 2, which extract the oil-impregnated exhaust or waste air. One cubic meter of exhaust air at normal pressure can contain 400 to 800 mg. of gaseous hydrocarbons and, for example, 50 mg. of hydrocarbons in droplet form.

The exhaust air which is to cleansed and which has a high proportion of roll oil vapors is passed to an exhaust air scrubber 3, in which it is brought into intimate contact with a wash oil. This wash oil is so chosen that it has a relatively low vapor pressure, so that the said oil itself is not volatilized in practice and is not able to contribute any vapor to the exhaust air, but on the other hand absorbs and dissolves the more volatile hydrocarbons. In the example shown, a wash oil is used in which the fraction is established by the bottom boiling point of 372° C.

While the exhaust air flows through the exhaust air scrubber 3, it gives off its hydrocarbon fractions to the wash oil without being able to take up any appreciable quantity of vapor from the said oil; the exhaust air that has been purified thereby is discharged by way of the elbow 4 and a fan 5 into a chimney 6. Located ahead of the inlet of the exhaust air scrubber 3 is an oil separator 7 provided to relieve the washing or scrubbing liquid of rolling oil which has been entrained in droplet form. Another oil separator 8 is arranged ahead of the elbow 4; it ensures that droplets of wash oil which are whirled during the washing or scrubbing operation are separated from the cleansed exhaust air.

In order to produce a thorough cleaning, the exhaust air is conducted through several several layers of wash oil located in the scrubber 3. Since it happens that, with an increasing rolling oil fraction of the washing liquid, the fractions of rolling oil vapor which can no longer be separated from the exhaust oil also increase, the exhaust air scrubber is charged in counter-flow. This is so that the entering exhaust air impinges on wash oil which has already taken up rolling oil vapor, whereas with increasing purification of the exhaust air, fresher wash oil is also brought into contact with the exhaust air.

The wash oil if fed to the exhaust air scrubber 3 from the storage container 9 by way of the pump 10 which acts on the liquid union or connection 11 and feeds the uppermost of the washing layers of the exhaust air scrubber. By way of overflows, the wash oil reaches the respective lower washing or scrubbing plate in counter-flow to the exhaust air and flows from the lowermost of the said plates through the liquid outlet 12 into a collecting container 13. The was oil containing rolling oil and collected in this container is forced by means of a pump 14 through a dirt filter 15 against the action of a pressure valve 16 into a vacuum preliminary degasifying unit 17, which is evacuated to a pressure of 6 to 10 mm. Hg. by a vacuum pump assembly consisting of a backing pump 18 and main pump 19. While the dirt filter 15 retains solid impurities, some of the water taken up by the was oil during the washing or scrubbing operation (and also practically all the absorbed gas, such as for example, oxygen and nitrogen) are extracted from the said wash oil in the vacuum preliminary degasifying unit 17 which is maintained at room temperature. Droplets of oil which are entrained in the exhaust air stream are separated out in the oil collector 21 which is located after the vacuum pump assembly.

At the outlet from the vacuum preliminary dgasifying unit 17, the wash oil (from which gases and water have already been extracted) is drawn off by means of the pump 22 and is conveyed via a heat exchanger 23 and a heating means 24 against the action of a pressure valve 25 into the vacuum distillation container 26. In the heat exchanger 23, the wash oil is heated up in counter-flow by the wash oil leaving the said vacuum distillation container. A further heating to a temperature between 100° C and 135° is produced in he heating means 24, which has to cover the thermal losses. Represented in the example shown is a heating means 24 which is heated by hot water; this arrangement can be replaced by electric heating oil heating, steam heating, or by any other desired heating arrangements.

The separation of the more volatile rolling oil fractions from the wash oil having the higher boiling point takes place in the vacuum distillation container at a temperature between 80° and 150°, which is adjustable at the heat exchanger 23, but more particularly in the heating means 24, and at a pressure which advantageously is below 1 mm. Hg. In the condenser 30 (which is cooled by means, not shown), the rolling oil removed by distillation is formed as distillate and can discharge into the condensate storage unit 31. From there it is capable of being extracted by way of a check valve 32 by means of a pump 33 into a rolling oil container 34 and, when added to fresh rolling oil, is once again in a serviceable form for the circulation of the rolling oil. The low pressure of about 1 mm. Hg. of the vacuum distillation container 26 is maintained by a vacuum pump assembly, which comprises a backing pump 35 and a main pump 36, following which is located an oil collector 38. Once again, a condenser 37 is arranged between the backing pump and main pump; the condensate which forms in the said condenser is able to pass through a siphon into the pipe leading to the condensate storage unit 31 (being capable of being guided through a throttle section into the said pipe) and/or by operation of valves. After sufficient quantities have accumulated, the condensate can be discharged into the said pipe.

The wash oil which is now also cleaned of the rolling oil in the vacuum distillation container 26 is drawn off from the said container by means of pump 27 and is forced back via a check valve 28 as well as the heating coil 29 of the heat exchanger 23 into the storage container 9, so that the wash water circuit is closed with its return to the collecting container 9, the regenerated wash oil having been cooled again in the heat exchanger 23.

The apparatus as described has proved to be extraordinarily advantageous in operation. The washing or scrubbing in accordance with the invention of the hydrocarbon charged exhaust air not only cleanses this air to a desirably low value with almost negligible proportions of undesired pollutants, but it is also possible to separate, collect and re-use the said pollutants, so that there are considerable savings with the apparatus shown in regard to the supply of rolling oil. It is quite possible to collect between 50 and 100 liters of rolling oil per hour from the exhaust or waste air of a conventional rolling mill; the savings made possible thereby with regard to the supply of rolling oil are fully able to cover at least the energy demand of the apparatus as described, so that the cleansing process can be carried into effect at comparatively low cost and, thus, in an economic manner.

It has been found to be important to use as washing or scrubbing liquid an oil which has such a low vapor pressure that, at the running temperature of the exhaust air scrubber, only a negligibly small proportion of oil is able to volatilize and pass over into the discharge. In order to facilitate the regeneration of the wash oil, it is also advantageous to select the vapor pressure thereof to be so low that it is in practice only the more volatile hydrocarbons which have been absorbed which pass over into the distillate during the distillation and also so that the wash oil itself is not volatilized in practice. Consequently, (on the one hand) an extensive and almost complete purification of the exhaust air is produced, while (on the other hand) the wash oil which is in circulation remains stable with regard to quality as well as quantity over long periods of time and does not cause any substantial operational costs.

The controlling of the complete installation does not present any essential difficulties. The circulation of the wash oil as well as the supply of the condensate are produced by a series of pumps; the pump 10 only operates against a low delivery pressure head and determines the admission of wash oil to the exhaust air scrubber 3. Since it determines the renewal of the passing wash oil, it preferably runs constantly during operation; however, it is also possible to adapt the throughput of wash oil to the actually occurring quantities of exhaust air by influencing the delivery quantity of the pump. This may be desirable, particularly in those cases where the exhaust air of several points is to be cleansed and some of these latter are out of operation from time to time.

The delivery pump 14 determines the quantities of wash oil supplied to the vacuum preliminary degasifying unit 17. Since the pump feeds from the usual pressure potential into a container maintained at a reduced pressure, it can (with the omission of the pressure valve 16) be replaced by a valve of which the delivery quantity is limited, preferably by either a throttling action, a limitation of flow, or a regulation of flow. In the preferred embodiment, the delivery pump 14 operates against the pressure potential adjusted at the pressure valve 16 on the reduced pressure maintained in the vacuum preliminary degasifying unit 17. The pressure valve is so adjusted that the delivery pump receives power for overcoming the pressure set on the pressure valve 16. However, the required proportioning of the delivery flow and the shutting off of the vacuum of the vacuum preliminary degasifying unit 17 can also be effected by the usual proportioning pumps having low leakage losses and in the from of displacements pumps; since such a proportioning pump delivers without a pressure valve in the direction of the potential drop, the associated driving arrangement has to take up power.

Similar conditions prevail with regard to the driving of the pump 22, which delivers from a potential of 10 mm. Hg., for example, to a potential of less than 1 mm. Hg. Provided in the example shown is a centrifugal pump, which operates against a pressure valve 25.

In the case of the pumps 27 and 33 (which draw off wash oil and condensate, respectively), the delivery is effected against the vacuum of the distillation container 26. So as to prevent in a reliable manner an undesirable aeration of the vacuum distillation container, check valves 28 and 32, respectively, are associated with the pumps.

It has proved to be desirable to produce (by means of the pumps) a gas-tight seal, so that the said pumps do not run dry; by way of example, the admission to the condensate storage unit 31 is (on the one hand) only to be within the scope of its capacity, but (on the other hand) the filling level is also not to fall below a prescribed minimum. In the example shown, containers in which the liquid is collected are always equipped with level-limiting switches 39 and 49. If the liquid level in the container in question (as for example, represented in respect of the collecting container 13) reaches the upper level switch 39, then the pump on the output side is switched "on" or, with a substantially continuously delivering pump, it is at least temporarily switched to a higher level. If the liquid level reaches the lower level switch 40, as is represented with respect to the condensate storage unit 31, then the pump 33 on the output side is stopped. Other possibilities regarding controlling the pumps are available, when at least some of the level switches are operative on pumps arranged ahead of the relevant vessel or overflow means, or when suction tubes having a suction effect at the specified level are used. In all cases, a thorough cleansing of exhaust air, even when it occurs in large quantities, is produced at an economically acceptable cost.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for separating hydrocarbons from flue gas or the like, comprising:
   a. a gas scrubber receiving hydrocarbon-charged gas,
   b. a flue to which the outlet of the scrubber is attached for the discharge of the said gas thereto,
   c. a conduit connected to the scrubber to provide it with wash oil in counterflow to the said gas,
   d. a collecting container connected by the said conduit and a pump to the scrubber to suppy it with the wash oil,
   e. a vacuum distillation container connected by a conduit and a pump to the gas scrubber to receive wash oil discharged therefrom,
   f. a condenser having an inlet connected by a conduit to the distillation container,
   g. a vacuum pump assembly connected to the outlet of the condenser,
   h. a condensate storage unit connected to the outlet of the condenser to receive the condensate, and
   i. a pump having an inlet connected by a conduit to the output side of the distillation container to bring about the return of the wash oil passing from the distillation container through a conduit connecting the output of the pump to the collecting container.

2. Apparatus according to claim 1, wherein a heating means is connected into the said conduit connecting the gas scrubber to the vacuum distillation container.

3. Apparatus according to claim 2, wherein the said heating means of the vacuum distillation container is vacuum distillation container.

4. Apparatus according to claim 3, wherein the said heating means of the vacuum distillation container is preceded by a heat exchanger having a coil through which passes wash oil which leaves the vacuum distillation container and is extracted by the pump at the output of the latter.

5. Apparatus according to claim 4, wherein a vacuum preliminary degasifying unit with an associated vacuum pump assembly is located in the conduit between the gas scrubber and the vacuum distillation container.

6. Apparatus according to claim 5, wherein a dirt filter for the wash oil is connected in the conduit leading from the gas scrubber.

7. Apparatus according to claim 6, wherein the input and the discharge paths of the gas scrubber are provided with oil separators.

8. Apparatus according to claim 7, wherein proportioning pumps are arranged in the conduits ahead of the vacuum distillation container and the vacuum preliminary degasifying unit.

9. Apparatus according to claim 8, wherein check valves are mounted in the conduits carrying the wash oil and the condensate from the vacuum distillation container.

* * * * *